United States Patent
Chaiken et al.

(10) Patent No.: US 6,438,701 B1
(45) Date of Patent: Aug. 20, 2002

(54) METHOD AND APPARATUS FOR EXTERNALLY GENERATING SYSTEM CONTROL INTERRUPTS AS RESUME EVENTS FROM POWER-ON SUSPEND MODE

(75) Inventors: Craig L. Chaiken, Tomball; Larry W. Kunkel, Houston, both of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/358,094

(22) Filed: Jul. 21, 1999

(51) Int. Cl.[7] .................................. G06F 1/26
(52) U.S. Cl. ...................... 713/323; 713/310
(58) Field of Search ................ 713/300, 310, 713/323; 323/205; 710/260, 261, 262, 263, 264, 266

(56) References Cited

U.S. PATENT DOCUMENTS

| | | | | |
|---|---|---|---|---|
| 5,842,028 A | * | 11/1998 | Vajapey | 713/310 |
| 6,105,142 A | * | 8/2000 | Goff et al. | 713/320 |
| 6,134,665 A | * | 10/2000 | Klein et al. | 713/300 |
| 6,301,673 B1 | * | 10/2001 | Foster et al. | 713/323 |
| 6,308,278 B1 | * | 10/2001 | Khouli et al. | 713/323 |
| 6,321,341 B1 | * | 11/2001 | Kamijo et al. | 713/340 |

OTHER PUBLICATIONS

82371FB (PIIX) and 823715B (PIIX3) PCI ISA IDE XCEL-ERATOR, Intel Corporation, Apr. 1997, pp. 1–2, 16, 38, 43–46, 77, 108–110.
VT82C586B PCI Integrated Peripheral Controller, Rev. 1.0, Via Technologies, Inc., May 19, 1997, 63 pages.
CHIP SETS, '97 Product Guide, Via Technologies, Inc., undated, 13 pages.
Advanced Configuration and Power Interface Specification; Intel/Microsoft/Toshiba, Revision 1.0, Dec 22, 1996, cover page, copyright page, 2–12 to 2–16, 3–17 to 3–26, 9–148, to 156.

* cited by examiner

Primary Examiner—Thomas Lee
Assistant Examiner—Thuan Du
(74) Attorney, Agent, or Firm—Akin, Gump, Strauss, Hauer & Feld, LLP

(57) ABSTRACT

A computer system allows resuming from Power-On Suspend (POS) mode by generating an interrupt. The interrupt generates a System Management Interrupt (SMI), which a controller uses to produce a POS resume event signal to resume the system from the Power-On Suspend mode. The system allows use of chipsets such as the VIA VT82C586B that are incapable of directly causing a resume from POS mode in response to an interrupt.

27 Claims, 3 Drawing Sheets

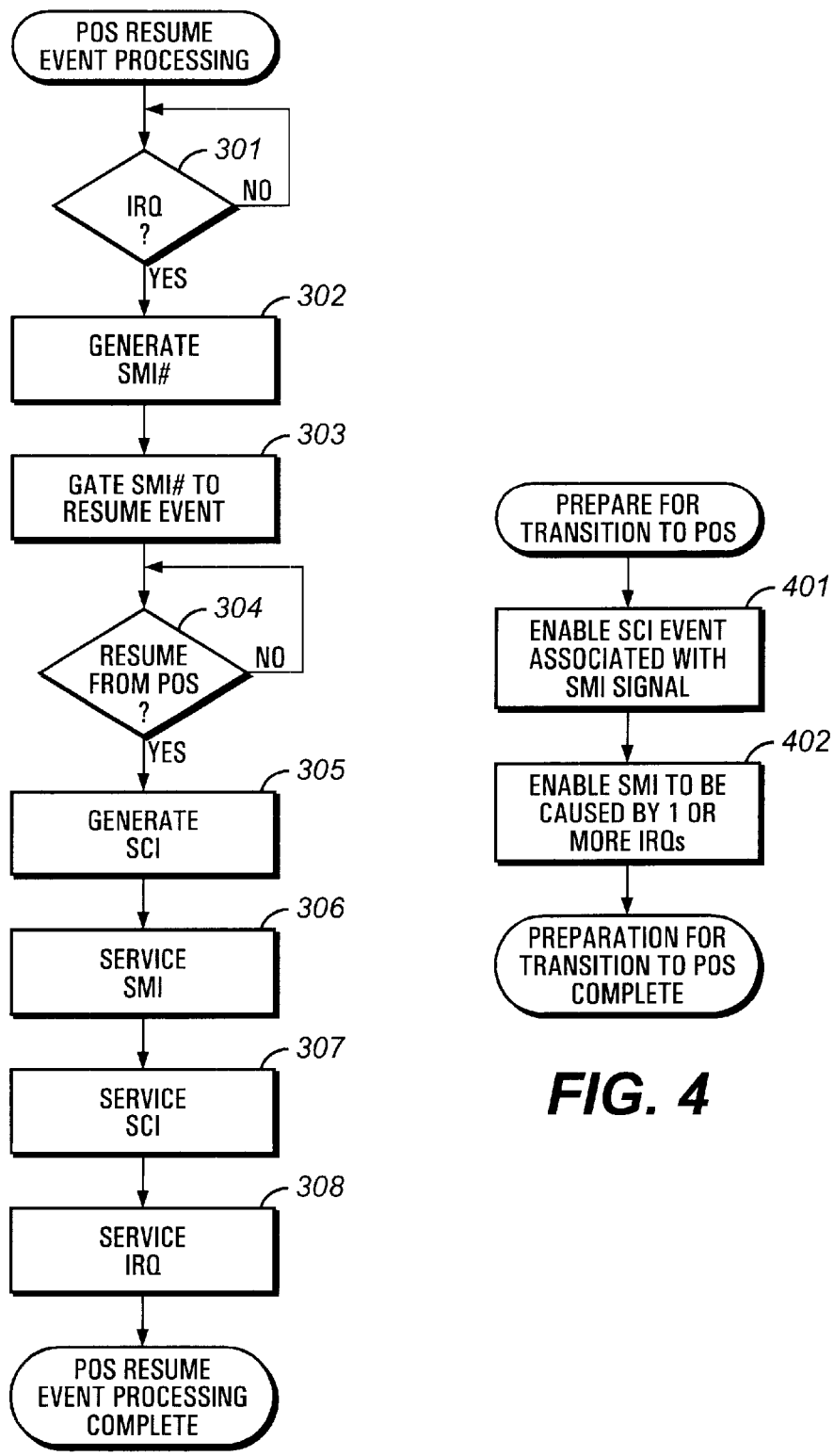

METHOD AND APPARATUS FOR EXTERNALLY GENERATING SYSTEM CONTROL INTERRUPTS AS RESUME EVENTS FROM POWER-ON SUSPEND MODE

BACKGROUND OF THE INVENTION

1. Field of the Invention

The present invention generally relates to resume events from Power-On Suspend mode, and more particularly to a method and apparatus for externally generating System Control Interrupts as resume events from Power-On Suspend mode.

2. Description of the Related Art

Since 1989, certain microprocessors, such as the Pentium® processor from Intel Corporation, have included a System Management Mode (SMM), which is entered upon receipt of a System Management Interrupt (SMI). SMM allows embedded code within the Basic Input Output System (BIOS) to slow down, suspend, or shut down part or all of the system platform, and even the Central Processing Unit (CPU) itself. SMIs were originally devised by Intel Corporation for portable systems. Portable computers often draw power from batteries which provide a limited amount of energy. To maximize battery life, an SMI is typically asserted to turn off or reduce the power to any system component not in use or to turn the power back on. Although originally designed for laptop computers, SMIs have become popular for desktop and other stationary computers as well, helping lower power usage.

In 1991, Intel and Microsoft Corporation introduced the Advanced Power Management (APM) specification as a means of integrating the operating system (OS) into the power management loop, allowing communication between the OS and the power management (PM) code embedded within the BIOS. APM creates an interface between the OS and the BIOS. One part of APM is the definition of four power states: full on, APM Enabled, APM Standby, and APM Suspend. In the APM Standby state, most devices are in a low power mode, the CPU clock is slowed or stopped, and the system is in a low power state which can be returned to normal activity quickly by events such as interrupts. No system context is lost. This state has become commonly known as Power-On Suspend (POS) mode.

Because developments in computer systems continued, the APM specification became inadequate to handle the changing hardware. One need was for a more general control of PM by the OS, which has access to more information about what tasks are running and what the user is doing, and is therefore in a better position to decide what devices should be on or off. The Advanced Configuration and Power Interface (ACPI) specification was developed in 1997 to address these needs, a copy of which is incorporated herein by reference.

On legacy (non-ACPI) systems, the SMI is an OS-transparent interrupt generated by interrupt events such as IRQs. By contrast, on ACPI systems, interrupt events generate an OS-visible system interrupt to notify the OS of ACPI events, known as a System Control Interrupt (SCI). Hardware platforms that support both legacy operating systems and ACPI systems must support a way of remapping the interrupt events between SMIs and SCIs when switching between ACPI and legacy models.

Controller chipsets which support both legacy and ACPI models exist. For example, the Silicon Integrated Systems Corporation's SIS 5595 chipset allows an IRQ to directly cause an SCI resume event. However, certain otherwise desirable chipsets, such as the VIA VT82C586B, are very limited in what events can generate an SCI. In the case of the VT82C586B, for example, hardware interrupts (IRQs) are not events capable of generating an SCI and therefore are not events which can resume a computer from POS mode. These limited capabilities have rendered such chipsets unsuitable for certain computer systems.

SUMMARY OF THE INVENTION

Briefly, a computer system according to an embodiment of the present invention provides a processor, an interrupt generator coupled to the processor, a System Management Interrupt (SMI) generator to generate an SMI in response to the interrupt generator, and a controller coupled to the processor providing an input connected to the SMI generator and a POS resume event signal generator to receive the SMI and generate a POS resume event signal to resume the computer system from Power-On Suspend (POS) mode.

In one embodiment of the invention, the controller is incapable of directly generating the POS resume event signal in response to an interrupt.

In another embodiment of the invention, the controller is a PCI/ISA bridge, preferably a VIA VT82C586B.

In one embodiment of the invention, the input pin is a GPIO pin. In another embodiment of the invention, the interrupt is an IRQ. Preferably, the POS resume event signal is a System Control Interrupt (SCI).

BRIEF DESCRIPTION OF THE DRAWINGS

A better understanding of the present invention can be obtained when the following detailed description of the preferred embodiment is considered in conjunction with the following drawings, in which:

FIG. 3 is a flow chart of a method for processing POS resume events in connection with the controller of FIG. 2 according to one embodiment of the present invention; and FIG. 4 is a flow chart showing how POS resume events are enabled before entering the POS state.

DETAILED DESCRIPTION OF THE PREFERRED EMBODIMENT

Figure 1:
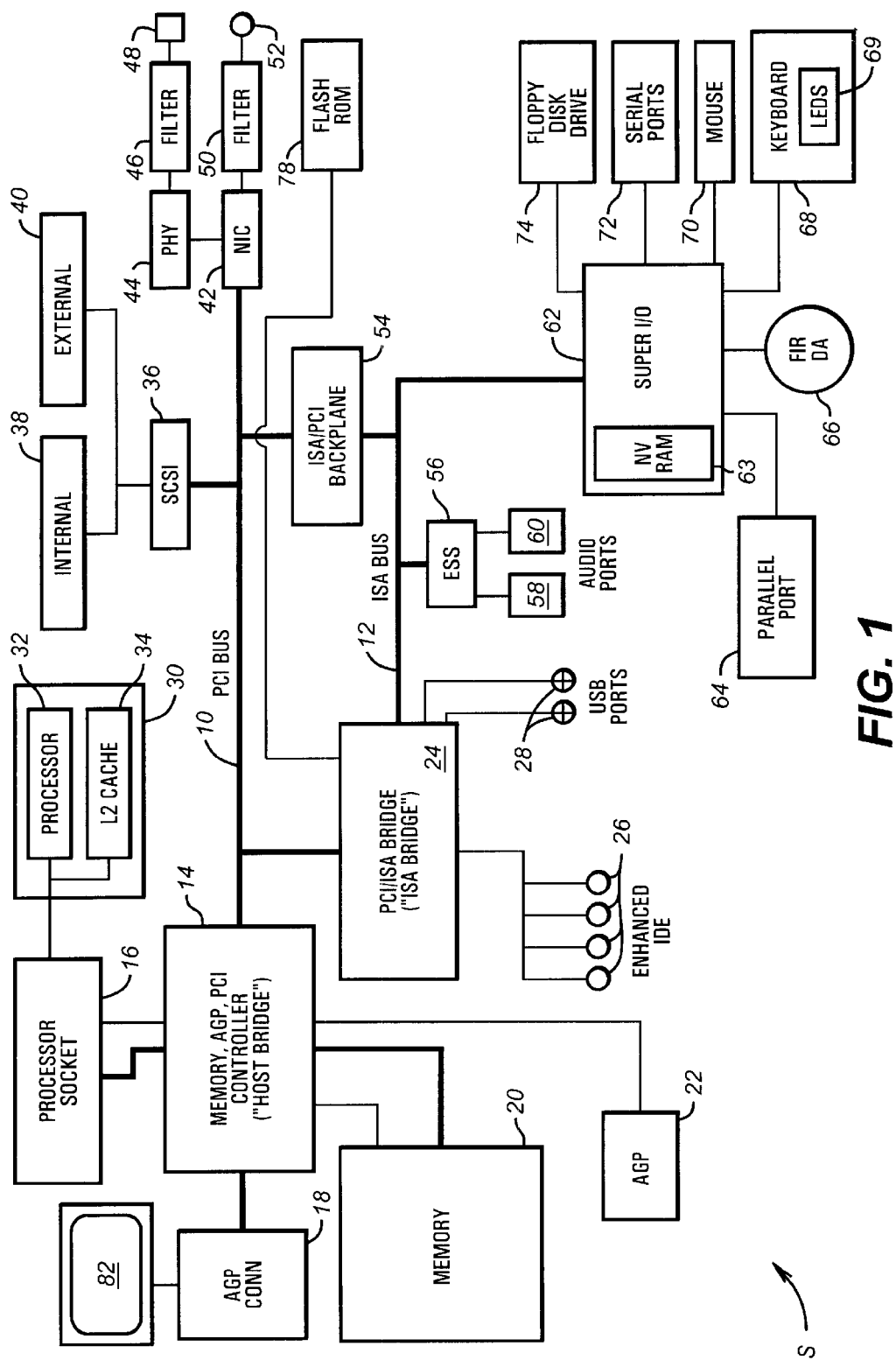
FIG. 1 is a block diagram of a computer system according to one embodiment of the present invention.

Turning to FIG. 1, illustrated is a typical computer system S implemented according to one embodiment of the invention. While this system is illustrative of one embodiment, the techniques according to the invention can be implemented in a wide variety of systems. The computer system S in the illustrated embodiment is a PCI bus/ISA bus-based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 bridges between the PCI bus 10 and the ISA bus 12.

The host bridge 14 in one embodiment is a VT82C598MVP by Via Technologies, Inc., also known as a PCI AGP Controller (PAC). The host bridge 14 could be replaced with chipsets other than the VT82C598MVP without detracting from the spirit of the invention. The PCI/ISA bridge 24 is a VT82C586B, by VIA Technologies, Inc. The host bridge 14 and PCI/ASA bridge 24 provide capabilities other than bridging between the processor socket 16 and the PCI bus 10, and between the PCI bus 10 and the ISA bus 12. Specifically, the disclosed host bridge 14 includes interface circuitry for the AGP connector 18, the memory subsystem 20, and the AGP 22. A video display 82 can be coupled to the AGP connector 18 for display of data by the computer system S. The PCI/ISA bridge 24 further includes an internal enhanced IDE controller for controlling up to four enhanced IDE drives 26, and a universal serial bus (USB) host controller 25 for controlling USB ports 28. The enhanced IDE drives 26 include hard disk drives and other mass storage subsystems.

The host bridge 14 is preferably coupled to the processor socket 16, which is preferably designed to receive an Advanced Micro Devices, Inc. K6-2 processor module 30, which in turn includes a microprocessor core 32 and a level two (L2) cache 34. The processor socket 16 could be replaced with processors other than the K6-2 without detracting from the spirit of the invention.

The host bridge 14, when the VT82C598MVP Host Bridge is employed, supports a memory subsystem 20 (or main memory) of extended data out (EDO) dynamic random access 20 memory (DRAM) or synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 supports up to 66 megahertz DRAMs, whereas the processor socket 16 can support various integral and nonintegral multiples of that speed.

The PCI/ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a direct memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), RTC, keyboard controller, an external microcontroller, and two general purpose devices. The enhanced power management within the PCI/ISA bridge 24 includes full clock control, device management, suspend and resume logic, advanced configuration and power interface (ACPI), and system management bus (SMBus) control, which is based on the inter-integrated circuit (I²C) protocol.

The PCI bus 10 couples a variety of devices that generally take advantage of a high speed data path. This includes a small computer system interface (SCSI) controller 36, with both an internal port 38 and an external port 40. In one embodiment, the SCSI controller 36 is a AIC-7860 SCSI controller. Also coupled to the PCI bus 10 is a network interface controller (NIC) 42. The NIC 42 is coupled through a physical layer 44 and a filter 46 to an RJ-45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the PCI/ISA bridge to a Super I/O chip 62, which in one embodiment is a standard Micro systems Corporation 672 Super I/O device. The Super I/O chip contains several logical devices, one of which is a Real Time Clock (RTC). Resident in the RTC of the Super I/O chip 62 is non-volatile Random Access Memory (NV RAM) 63. This Super I/O chip 62 provides a variety of input/output functionality, including a parallel port 64, an infrared port 66, a keyboard controller for a keyboard 68, a mouse port for a mouse 70, additional series ports 72, and a floppy disk drive controller for a floppy disk drive 74. These devices are coupled through connectors to the Super I/O chip 62. Resident on the keyboard 68 are light emitting diodes (LEDs) 69. The floppy disk drive 74 includes disk drives for a 3 ½" and 5 ¼" floppy disks and Advanced Technology Attachment Packet Interface (ATAPI) drives, including the LS-120 drives.

The PCI/ISA bridge 24 is also coupled to a flash ROM 78, which can include both basic input/output system (BIOS) code for execution by the processor 32, as well as an additional code for execution by microcontrollers in a ROM-sharing arrangement.

An additional feature of the computer system S is a System Management Mode (SMM). Configuration of a secure memory, such as SMM memory, within the main memory 20 is well known to those skilled in the art. It is also noted that FIG. 1 presents an exemplary embodiment of the computer system S and it is understood that numerous other effective embodiments could readily be developed as known to those skilled in the art.

Figure 2:
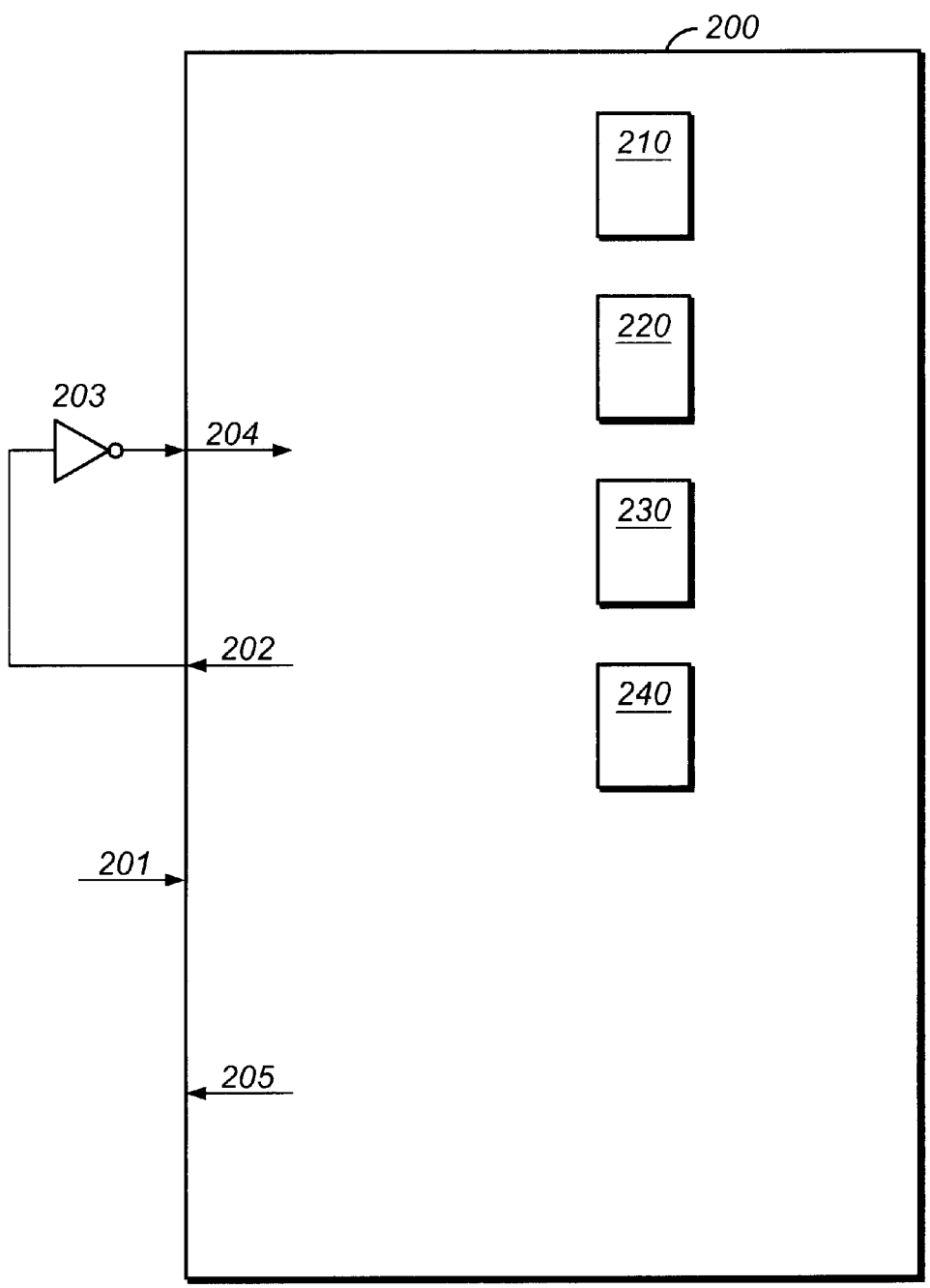
FIG. 2 is a block diagram of a controller according to one embodiment of the present invention.

FIG. 2 illustrates a VIA VT82C586B, a controller 200 in accordance with one embodiment of the present invention. Internal logic and connections within the controller 200 are not shown; only those registers and pins helpful to an understanding of the present invention are shown. The controller 200 corresponds to the PCI/ISA bridge 24 of FIG. 1.

The VT82C586B can generate an SCI in POS mode upon receipt of a Ring Indicator (RI#), a Power Button (PWRBTN#), or a Real Time Clock Alarm (RTC Alarm) signal (not shown), as required by the ACPI specification. However, it cannot directly generate an SCI in POS mode for hardware interrupt signals 15, 14, 11-9, and 7-3.

Input pin 201 represents the 10 pins for IRQ 15, 14, 11-9, and 7-3. Although each IRQ has a separate pin, the single pin 201 is shown for clarity of the drawing. Output pin 202 is SMI#, the System Management Interrupt. Input pin 204 is a General Purpose Input/Output (I/O) line GPIO1. Output pin 205 is a INTR, a CPU interrupt signal that signals a CPU that an interrupt request is pending.

Register 210 is a System Control Interrupt Configuration register (SCI_INT). Register 220 is a Power Management Control register. Register 230 is a Primary Interrupt Channel register. Register 240 is a Global Enable register. One skilled in the art will be familiar with the operation of such registers.

In accordance with one embodiment of the present invention, SCI_INT register 210 is set to specify the IRQ used as the SCI interrupt. The OS is required by the ACPI specification to treat the ACPI SCI interrupt as a sharable, level, active low interrupt. The Register 220 SCI Enable (SCI_EN) flag indicates whether power management events should generate an SCI or an SMI, further indicating whether the system is in ACPI or legacy mode respectively.

In accordance with one embodiment of the present invention, SCI_EN should indicate that an SCI is to be generated. Register 220 also contains bits indicating the power state of the system, SLP_TYP. In accordance with one embodiment of the present invention, SLP_TYP should indicate that the computer system S is in a Power-On Suspend (POS) state or mode. In the POS state, all devices in the computer system S have power except the clock synthesizer. The only power consumed is due to DRAM refresh and leakage current of the power devices. The processor 32 is put into an ACPI C3 state. For a detailed description of the ACPI C3 processor state, see the Advanced Configuration and Power Interface Specification.

Register 230 indicates which IRQs should be considered primary interrupts. Register 240 contains a flag PACT_EN indicating whether primary interrupts should trigger a System Management Interrupt (SMI#) on pin 202. In accordance with one embodiment of the present invention, PACT_EN must be set to trigger SMI# on a primary interrupt.

In a system according to one embodiment of the present invention, an interrupt asserted on pin 201 will be a primary interrupt according to register 240. Because PACT_EN has been set, this interrupt will trigger or generate an SMI#. Because SMI# is an active low signal, and GPIO1 is an active high signal, SMI# is gated through inverter 203 to pin 204, signaling a GPIO1 event. Because SCI_EN has been set in the register 220, the GPI01 event will then generate an SCI interrupt if the SLP_TYP bits in the register 220 indicate that the system is in the POS state. One skilled in the art will appreciate that a variety of logic internal to the controller 200 can be used to gate the SLP_TYP indication and the GPI01 signal to generate the SCI interrupt. The controller 200 will then generate the IRQ interrupt configured in register 210 as the SCI interrupt and raise signal INTR on pin 205, signaling the processor 32 to resume from POS and call the OS's ACPI routines.

Prior to entering the POS state, a system according to one embodiment of the present invention enables the POS resume events as illustrated in FIG. 4. First, the SCI event associated with the SMI signal is enabled in step 401. Next, the controller 200 enables SMI to be caused by one ore more IRQs as in step 402. At this point, preparation for transition to the POS state is complete.

The processor connected to controller 200 will receive three interrupts: SMI#, SCI, and the original IRQ that triggered POS resume. As illustrated in FIG. 3, these interrupts will be handled first by logic in the controller 32. The controller will first recognize the IRQ in step 301. Because PACT_EN is set, the controller 32 will then generate SMI# in step 302. Logic external to the controller 32 gates SMI# to a pin which can generate a POS resume event in step 303. As shown in FIG. 2, this may involve inverting the active low SMI# if the pin generating a resume event is an active high signal such as GPIO1. In step 304, the controller 32 will verify that it is in POS state so that the resume event should generate an SCI in step 305. Now all three interrupts have been generated. In step 306 BIOS routines will process the SMI, passing control to the OS after powering up the system from the ACPI C3 state as necessary. The SMI handler disables the event which caused the SMI, and clears the status of the SMI event. The SCI or IRQ status is not cleared. In step 307, ACPI routines in the OS will then service the SCI, providing power to any devices as necessary. The ACPI operating system disables the SCI events, clears the SCI status, and executes an ACPI control method associated with the SCI status bit. The OS will then service the original IRQ that triggered the resume event in step 308, completing the POS resume event processing. The driver or application that owns the IRQ clears the IRQ and processes the IRQ event.

Thus, according to one embodiment of the present invention, controllers such as the VT82C586B, which cannot directly generate SCIs in response to IRQs while in POS mode, are capable of generating SCIs to wake an ACPI—compliant processor from POS mode in response to hardware interrupts.

The foregoing disclosure and description of the preferred embodiment are illustrative and explanatory thereof, and various changes in the steps, circuit elements, and wiring connections, as well as in the details of the illustrated circuitry and construction and method of operation may be made without departing from the spirit of the invention.

What is claimed is:

1. A method of resuming from power-on suspend mode in response to an interrupt on a computer system, the computer system including a controller, the method comprising the steps of:

receiving a system management interrupt generating event by the controller;

generating a system management interrupt in response to the system management interrupt generating event;

externally routing the system management interrupt to a POS resume event signal generator in the controller; and generating a POS resume event signal responsive to the system management interrupt to wake the computer system from the power-on suspend mode.

2. The method of claim 1, further comprising the step of:

servicing the system management interrupt generating event, the system management interrupt and the POS resume event signal upon waking of the computer system from the power-on suspend mode.

3. The method of claim 1, wherein the step of receiving a system management interrupt generating event comprises the step of receiving an interrupt request (IRQ).

4. The method of claim 1, wherein the step of generating a POS resume event signal comprises the step of generating a system control interrupt (SCI).

5. The method of claim 1, wherein the controller is a Peripheral Component Interconnect (PCI)/Industry Standard Architecture (ISA) bridge.

6. The method of claim 5, wherein the PCI/ISA bridge is a VIA VT82C586B.

7. The method of claim 1, wherein the controller is incapable of directly generating the POS resume event signal in response to an interrupt.

8. The method of claim 1, the routing step comprising the step of gating the system management interrupt and the POS resume event signal.

9. The method of claim 1, further comprising the step of:

enabling the system management interrupt generating event to generate a system management interrupt.

10. A computer system configured to resume from power-on suspend (POS) mode in response to an interrupt, the computer system comprising:

a processor;

an interrupt generator coupled to the processor;

a system management interrupt (SMI) generator to generate an SMI in response to an interrupt from the interrupt generator; and a controller coupled to the processor, the controller comprising:

an input pin connected to the SMI generator to receive the SMI; and a POS resume event signal generator connected to the input pin to gate the SMI and generate a POS resume event signal to resume the computer system from the POS mode.

11. The computer system of claim 10, wherein the controller is incapable of directly generating the POS resume event signal in response to an interrupt.

12. The computer system of claim 10, wherein the controller is a Peripheral Component Interconnect (PCI)/Industry Standard Architecture (ISA) bridge.

13. The computer system of claim 12, wherein the PCI/ISA bridge is a VIA VT82C586B.

14. The computer system of claim 10, wherein the input pin is a General Purpose Input/Output (GPIO) pin.

15. The computer system of claim 10, wherein the interrupt is an Interrupt Request (IRQ).

16. The computer system of claim 10, wherein the POS resume event signal is a System Control Interrupt (SCI).

17. A power resumption circuit for signaling a processor to resume from power-on suspend mode, comprising:

an interrupt generator;

a system management interrupt (SMI) generator coupled to the interrupt generator to generate an SMI responsive to an interrupt; and a controller coupled to the SMI generator, the controller comprising:

an input pin connected to the SMI generator to receive the SMI; and a POS resume event signal generator connected to the input pin to gate the SMI and generate a POS resume event signal to resume the processor from POS mode.

18. The circuit of claim 17, wherein the controller is incapable of directly generating the POS resume event signal on response to an interrupt.

19. The circuit of claim 17, wherein the controller is a PCI/ISA bridge.

20. The circuit of claim 19, wherein the PCI/ISA bridge is a VIA VT82C586B.

21. The circuit of claim 17, wherein the input pin is a General Purpose Input/Output (GPIO) pin.

22. The circuit of claim 17, wherein the interrupt is an Interrupt Request (IRQ).

23. The circuit of claim 17, wherein the POS resume event signal is a System Control Interrupt (SCI).

24. A computer system configured to resume from Power-On Suspend (POS) mode in response to an interrupt, the computer system comprising:

a processor;

an interrupt generating means for generating interrupts coupled to the processor;

a SMI-generating means for generating System Management Interrupts (SMI) responsive to an interrupt coupled to the interrupt generating means; and a POS resume event signal generating means for generating a POS resume event signal to resume the computer from POS mode coupled to the SMI-generating means.

25. The computer system of claim 24, wherein the POS resume event signal generating means is incapable of directly generating the POS resume event signal in response to an interrupt.

26. The computer system of claim 24, wherein the POS resume event signal generating means comprises:

an input means for receiving the SMI; and a means connected to the input means for generating the POS resume event signal from the SMI.

27. The computer system of claim 24, wherein the POS resume event signal is a system control interrupt (SCI).

* * * * *